United States Patent Office 2,916,372
Patented Dec. 8, 1959

2,916,372

PRODUCTION OF PHOSPHATE FERTILIZERS SOLUBLE IN CITRIC ACID

Franz Schytil, Frankfurt, Germany, assignor to Lurgi Gesellschaft für Chemie und Huttenwesen m.b.H., Frankfurt am Main, Germany No Drawing. Application May 3, 1955
Serial No. 505,848

2 Claims. (Cl. 71—45)

The present invention relates to a process for the production of a phosphate fertilizer soluble in citric acid by calcining raw phosphates, if desired, in admixture with other materials, especially small quantities of soda and, if desired, silica, at temperatures below their melting point.

There are two fundamentally different procedures involving calcination which have been proposed for the conversion of raw phosphates into a more soluble or available form. In one of such procedures the apatite of the raw phosphate can be converted to sodium calcium phosphate which is very suitable as a fertilizer by admixing 20 to 30% of soda and calcining at temperatures of about 1200° C. In this procedure, it is not necessary that the fluorine content of the phosphate be driven out. In accordance with the other procedure the apatite is converted into α-tricalcium phosphate by adding silica and calcination in a steam containing atmosphere at temperatures over 1400° C. whereby the fluorine is driven out as hydrogen fluoride. Whereas the first procedure has been used commercially despite its high soda requirements, the second procedure has up to the present not been found acceptable for the commercial production of phosphatic fertilizers. The reason for this is that the high temperatures required, which in the case of many raw phosphates is only about 100° C. below their melting point, cause the softening and agglomeration of the furnace charge so that it sticks to the walls of the furnace. This also shows the diffusion of the steam into the charge and the diffusion of the hydrogen fluoride out of the charge so that a favorable degree of conversion cannot be achieved during treating periods which are economically feasible. Furthermore, it is difficult to move the sticky charge through the furnace.

It is an object of the present invention to provide an improved procedure for the conversion of raw phosphate into a more soluble or available form by calcination under a steam containing atmosphere.

In accordance with the invention, it has been found that the tendency for the furnace charge to become sticky can be substantially reduced if the raw phosphate containing material charged into the furnace has been granulated to provide a substantially uniform grain size which is not too small, for example, between 3 mm., preferably 4 mm., and 8 mm. in diameter, and the size of the individual grains of the charge does not vary more than about 1 mm. Larger grain sizes would have a lower tendency to become sticky and would for this purpose be more favorable, but an economical conversion is not possible with such larger grain sizes.

Such a granulated product in which the individual grains are substantially of the same size forms a loose aggregate in which the individual granules only contact each other at a few points. The numerous spaces between the granules permit unhindered passage of gases through the aggregate. With a granulated mass of substantially uniform grain size, one also obtains a uniform conversion of their phosphate content whereas granules of different grain sizes require substantially different periods of time for conversion. Preferably granules are employed which are not only of substantially the same size but are also similarly shaped, for example, they can be in the form of spherically shaped crumbs or in the form of cylinders whose height and diameter are substantially equal.

When uniformly granulated crude phosphates containing no additional materials are converted according to the invention by calcination under a steam containing atmosphere, temperatures over 1400° C. are required but temperatures above 1500° C. should be avoided. Advantageously the temperature selected is about 100° C. below the melting point of the funace charge. The α-tricalcium phosphate produced by such calcination must be cooled rapidly after leaving the high temperature zone, for example, upon being discharged from the rotary furnace employed for the calcination as otherwise there is the danger that the α-tricalcium phosphate will be transformed into β-tricalcium phosphate which is not suited as a fertilizer. According to the invention it was furthermore found that the α form could be stabilized to such an extent that the cooling procedure is no longer of such critical significance by the incorporation of small quantities of soda in the furnace charge. The quantity of soda incorporated is about 4 to 8%, preferably, 5 to 6% of the phosphate content of the charge. The incorporation of such small quantities of soda in the furnace charge not only has the effect of stabilizing the converted phosphate obtained so that it is not transformed to the β form even upon slow cooling but also substantially increases the velocity of the conversion of apatite to α-tricalcium phosphate. For example, the speed of defluorination is increased fivefold by the addition of 5% of soda. It is consequently possible to decrease the temperature employed for the calcination and complete conversion can already be attained at 1350° C. with economically feasible reaction periods. Furthermore, it was unexpectedly found that the addition of soda within the ranges indicated increases the melting point of the furnace charge so that the danger of agglomeration is reduced as the operating temperature is further removed from the melting point of the charge. Consequently, it was found when working with furnace charges containing soda it was not necessary to be as exact in providing uniformity of the grain size of the charge and that a latitude of about 2 mm. difference in grain size was possible. However, it was found preferable not to permit the grain size to vary more than 1 mm. as this is of significance in the degasification of the charge. It was found that the incorporation of the quantity of soda which gave the highest melting point for the charge also provided the optimum reaction velocity.

The action of the addition of soda is of fundamental significance insofar as it renders it generally possible to carry out the conversion according to the invention at temperatures as low as 1350° C. Naturally it is also possible to employ higher temperatures even though it may cause some difficulties depending upon the materials treated.

If the phosphate rock which is to be converted is poor in silica there is a danger of the formation of hydroxy apatite. This can be avoided in the known manner by the incorporation of additional silica in the charge. It is advantageous that the quantity of silica incorporated is so selected that a maximum melting point is attained in the admixture. Advantageously, the total quantity of silica derived from the phosphate rock itself and that added is between 5 and 15% or between 25 and 35%. Silica contents between 15 and 25% are unfavorable as low melting eutectics are formed especially when the charge contains soda. Consequently, if the phosphate rock has a silica content within this range, it is desirable to add sufficient silica to avoid such range. A silica content within the 5–15% range is most favorable for the economy of the conversion. Preferably, the silica content is so selected that all of the CaO which is not bound as tricalcium-phosphate and all of the MgO is converted to calcium and magnesium monosilicates. Phosphate-soda-silica mixtures in addition to having high resistance to overheating also exhibit a high defluorinating velocity.

Expediently, the raw phosphate and soda and, if necessary, the silica are ground together to the fineness of cement and finely ground material and then granulated with the addition of water, for example, in mixing vessels. The calcination follows the drying and classification of the resulting granules. A rotary tube furnace with a basic lining is well suited for carrying out the calcination. It is advisable not to use a furnace with an acid lining as the granules have a tendency to stick to the lining during the calcination.

The advantages of the process according to the invention are illustrated in the following examples:

Example 1

An American pebble phosphate was ground to the fineness of cement without the addition of other materials, and granulated by spraying on water in a mixer. A fraction of granules having a diameter of 5 mm. ±0.5 mm. was sieved off from the granulated product. This fraction was calcined in a rotary tube furnace for 2 hours at 1350° C. under an atmosphere which contained 15% of steam. The calcined product contained 11.5% of $P_2O_5$ soluble in citric acid and 1.3% of fluorine. The same finely ground phosphate was thoroughly mixed with 5% of soda and such mixture granulated, fractionated and calcined as described above. The calcined product in this instance contained 31.5% of $P_2O_5$ soluble in citric acid and 0.005% of fluorine. When the calcination was carried out on the ground phosphate without additions or granulation the calcined product only contained 4% of $P_2O_5$ soluble in citric acid after 2 hours' calcination which is lower than that of the citric acid soluble $P_2O_5$ content of 5.4% of the original uncalcined phosphate. When the calcination was carried out on the ground phosphate and soda admixture without granulation, the calcined product only contained 8% of $P_2O_5$ soluble in citric acid. The melting point of the raw pebble phosphate was 1565° C. Upon admixture with the soda it was raised to 1590° C. The silica content of the raw phosphate was 7%.

Example 2

A Moroccan raw phosphate with a 75% apatite content was ground to the fineness of cement and mixed with 4% of soda and 7% of sand which was also ground to the fineness of cement. This mixture was then granulated as descirbed in Example 1 to produce a granulated product of a grain size of 4 mm. ±0.5 mm. The granulated product was then calcined in a rotary tube furnace under an atmosphere containing 25% of steam at 1375° C. for 100 minutes. The calcined product contained 33.4% of $P_2O_5$ soluble in citric acid. The total $P_2O_5$ content of the calcined product was 34.1%.

Example 3

A pebble phosphate which had been completely converted without the addition of other materials by calcination under a steam containing atmosphere at 1400° C. was permitted to cool slowly during half an hour. During such cooling, the citric acid soluble phosphate content decreased by a third. When the same phosphate was admixed with 6% of soda, granulated according to the invention and calcined until the phosphate was completely converted and then allowed to cool slowly under the same conditions as the calcined phosphate without the addition of soda, the citric acid soluble phosphate only decreased about one fiftieth.

The process according to the invention in view of the low soda additions renders it possible to produce calcined phosphates having a citric acid soluble $P_2O_5$ content of over 30% in comparison to the 25% citric acid soluble $P_2O_5$ content which is attained when raw phosphates are calcined with admixtures of 20 to 25% of soda.

The process according to the invention provides a number of advantages over the known conversion process employing large additions of silica and temperatures over 1500° C. in which the material to be calcined is sprayed into a rotary tube furnace in the form of a slurry. The granulation achieved in this known process is very uneven with the result that insufficient de-fluorination takes place as many granules which are too large are not calcined for a sufficient length of time. The fluorine content of the calcined product of such known process is about 0.1% whereas that of the process according to the invention is only 0.005%.

I claim:

1. In a process for the production of citric acid soluble phosphatic fertilizers by calcining raw apatitic phosphate under a steam containing atmosphere at temperatures of at least 1350° C., the steps which comprise admixing 4 to 8% of soda with the raw phosphate and also admixing with such raw phosphate a quantity of silica to provide a silica content between 5 and 15% based on said raw phosphate, granulating the raw phosphate, silica and soda mixture to form granules of a substantially uniform grain size not varying over 1 mm. and shape, the grain size being at least 3 mm. in diameter up to 8 mm. in diameter and calcining the granulated product of uniform grain size and shape under an atmosphere containing steam at temperatures of at least 1350° C.

2. In a process for the production of citric acid soluble phosphatic fertilizers by calcining raw apatitic phosphate under a steam containing atmosphere at temperatures of at least 1350° C., the steps which comprise admixing 4 to 8% of soda with the raw phosphate and also admixing with such raw phosphate a quantity of silica to provide a silica content between 25 and 35% based on said raw phosphate, granulating the raw phosphate, silica and soda mixture to form granules of a substantially uniform grain size not varying over 1 mm. and shape, the grain size being at least 3 mm. in diameter up to 8 mm. in diameter and calcining the granulated product of uniform grain size and shape under an atmosphere containing steam at temperatures of at least 1350° C.

References Cited in the file of this patent

UNITED STATES PATENTS

| | | |
|---|---|---|
| 252,029 | Gibbons et al. | Jan. 10, 1882 |
| 959,841 | Carpenter | May 31, 1910 |
| 1,016,352 | Meriwether | Feb. 6, 1912 |
| 1,163,130 | Connor | Dec. 7, 1915 |
| 1,842,843 | Roethe et al. | Jan. 26, 1932 |
| 2,093,176 | Tromel | Sept. 14, 1937 |
| 2,183,379 | Franck et al. | Dec. 12, 1939 |
| 2,533,027 | Maust et al. | Dec. 5, 1950 |
| 2,754,191 | Hollingsworth et al. | July 10, 1956 |